(12) United States Patent
Funagi

(10) Patent No.: US 10,817,727 B2
(45) Date of Patent: Oct. 27, 2020

(54) INFORMATION PROCESSING APPARATUS AND METHOD OF CONTROLLING AN INFORMATION PROCESSING APPARATUS THAT ESTIMATE A WAITING TIME IN A WAITING LINE

(71) Applicant: CANON KABUSHIKI KAISHA, Tokyo (JP)

(72) Inventor: Tetsuhiro Funagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 16/235,050

(22) Filed: Dec. 28, 2018

(65) Prior Publication Data
US 2019/0213422 A1    Jul. 11, 2019

(30) Foreign Application Priority Data
Jan. 10, 2018   (JP) .................................. 2018-001993

(51) Int. Cl.
*G06K 9/00*    (2006.01)
*G06Q 30/02*   (2012.01)
(Continued)

(52) U.S. Cl.
CPC ..... *G06K 9/00778* (2013.01); *G06K 9/00369* (2013.01); *G06Q 30/0281* (2013.01);
(Continued)

(58) Field of Classification Search
CPC . G06T 2207/30242; G06T 2207/30196; G06T 2207/30241; G06T 7/55;
(Continued)

(56) References Cited

U.S. PATENT DOCUMENTS

| | | | |
|---|---|---|---|
| 2009/0034846 A1* | 2/2009 | Senior ................ | G06K 9/00778 382/190 |
| 2009/0063205 A1* | 3/2009 | Shibasaki .............. | G07C 11/00 705/5 |

(Continued)

FOREIGN PATENT DOCUMENTS

| | | | |
|---|---|---|---|
| JP | 2004-287752 | 10/2004 | |
| JP | 2004287752 | * 10/2004 | ............. G08B 25/00 |

(Continued)

*Primary Examiner* — Amara Abdi
(74) *Attorney, Agent, or Firm* — Venable LLP

(57) ABSTRACT

An information processing apparatus estimates a waiting time in a waiting line configured by a plurality of objects and includes at least one processor coupled to a memory, serving as a first obtaining unit to obtain a number of objects detected in an image in which the waiting line is captured, a second obtaining unit to obtain a number of objects that leave the waiting line per unit time, a correcting unit to correct the first obtained number by multiplying a correction coefficient with the first obtained number, in a case when the first obtained number is equal to or greater than a predetermined threshold, and an estimation unit to estimate the waiting time in the waiting line based on the corrected number and the second obtained number, when the first obtained number is equal to or greater than the predetermined threshold.

14 Claims, 7 Drawing Sheets

(51) Int. Cl.
    *G06T 7/55*        (2017.01)
    *G06T 7/20*        (2017.01)
    *H04N 5/247*      (2006.01)

(52) U.S. Cl.
    CPC ............... *G06T 7/20* (2013.01); *G06T 7/55* (2017.01); *G06T 2207/30196* (2013.01); *G06T 2207/30241* (2013.01); *G06T 2207/30242* (2013.01); *H04N 5/247* (2013.01)

(58) Field of Classification Search
    CPC .. G06T 7/20; G06K 9/00778; G06K 9/00369; G06Q 30/0281; H04N 5/247
    See application file for complete search history.

(56) References Cited

U.S. PATENT DOCUMENTS

| | | | | |
|---|---|---|---|---|
| 2015/0142481 A1* | 5/2015 | McManus | ............... | G07B 15/02 |
| | | | | 705/5 |
| 2015/0324647 A1* | 11/2015 | Wuethrich | ......... | G06K 9/00369 |
| | | | | 382/103 |
| 2016/0191865 A1* | 6/2016 | Beiser | ................ | G06K 9/00778 |
| | | | | 348/156 |

FOREIGN PATENT DOCUMENTS

| | | | | |
|---|---|---|---|---|
| JP | 2005-316582 | * | 11/2005 | ............. G06Q 50/00 |
| JP | 2008-217-289 | * | 9/2008 | ............. G01B 11/00 |

* cited by examiner

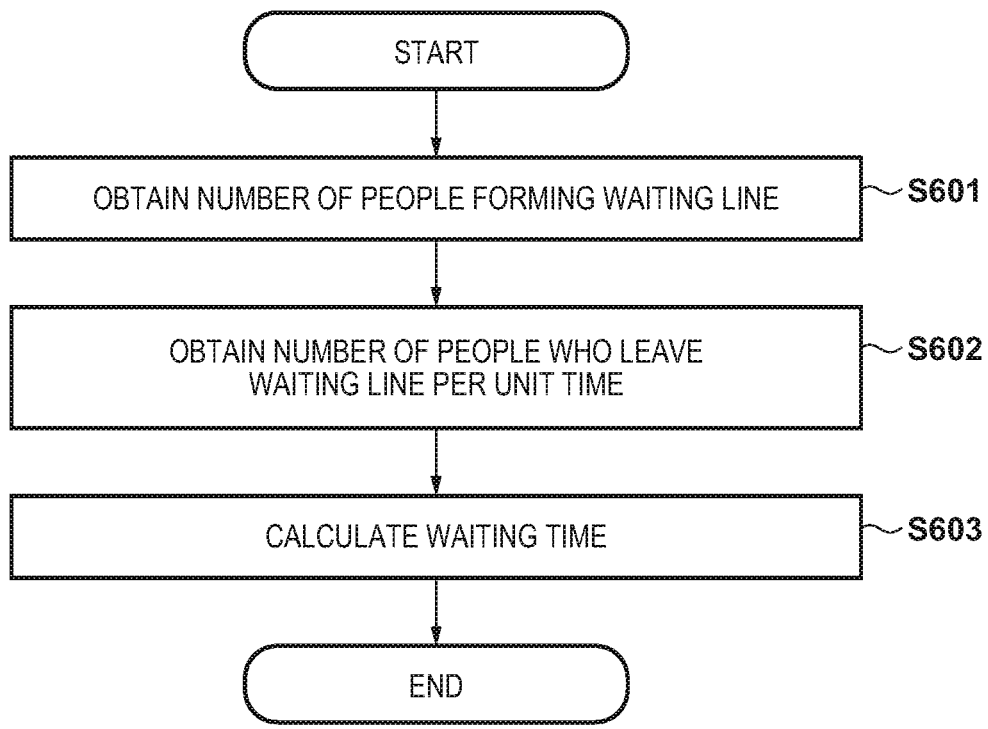
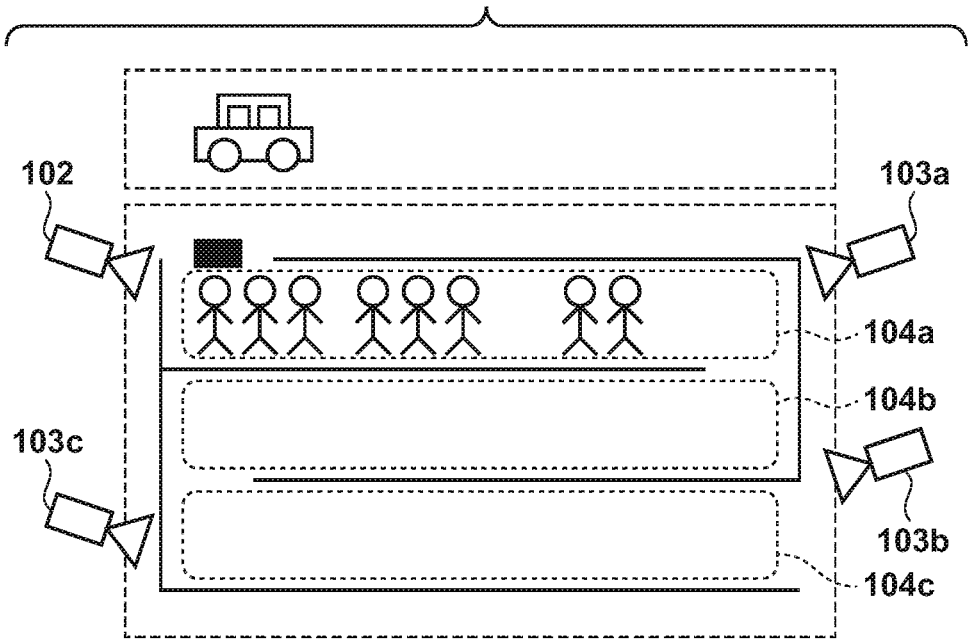

INFORMATION PROCESSING APPARATUS AND METHOD OF CONTROLLING AN INFORMATION PROCESSING APPARATUS THAT ESTIMATE A WAITING TIME IN A WAITING LINE

CROSS REFERENCE TO RELATED APPLICATION

This application claims the benefit of Japanese Patent Application No. 2018-001993, filed Jan. 10, 2018, which is hereby incorporated by reference herein in its entirety.

BACKGROUND OF THE INVENTION

Field of the Invention

The present invention relates to a technique for estimating a waiting line waiting time.

Description of the Related Art

Systems are known that estimate and notify a waiting time in a case when users form a waiting line when using a facility. For example, one known system that estimates and notifies a waiting time is a system that captures an image of users in a line, detects a movement trajectory of the users by image analysis, and identifies a waiting line that the users form thereby.

Japanese Patent Laid-Open No. 2005-316582 discloses a system that, based on an average unit time required for using a facility and a waiting line of identified users, calculates and notifies a waiting time after which a user will be able to use the facility. Furthermore, Japanese Patent Laid-Open No. 2004-287752 discloses a technique by which people or groups are recognized from a captured image of a waiting line, a movement time for a particular person or group is measured, and the waiting time is estimated.

However, there is a problem in the foregoing conventional techniques in that, in cases such as when the waiting line is congested and several people overlap in a captured image, the person identification accuracy is lower, and the error in the traveling distance calculation and waiting time computation is large.

SUMMARY OF THE INVENTION

According to one aspect, the present invention provides an information processing apparatus operable to estimate a waiting time in a waiting line configured by a plurality of objects, the information processing apparatus comprising a first obtaining unit configured to obtain a number of objects detected in an image in which the waiting line is captured, a second obtaining unit configured to obtain a number of objects that leave the waiting line per unit time, a correcting unit configured to correct the number obtained by the first obtaining unit by multiplying a correction coefficient with the number obtained by the first obtaining unit, in a case when the number obtained by the first obtaining unit is a predetermined threshold or more, and an estimation unit configured to estimate a waiting time in the waiting line based on the corrected number and the number obtained by the second obtaining unit, in the case when the number obtained by the first obtaining unit is the predetermined threshold or more.

The present invention provides a technique that enables higher accuracy estimation of a waiting line waiting time.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a flowchart that describes an operation of the information processing apparatus.

FIG. 8 is a view that illustrates an explanatorily waiting line state.

DESCRIPTION OF THE EMBODIMENTS

With reference to the drawings, an explanation is given in detail below of examples of embodiments of the invention. Note, the following embodiments are only examples and are not intended to limit the scope of present invention.

First Embodiment

As a first embodiment of an information processing apparatus according to the present invention, an example will be described below of a system that estimates a waiting time based on an image of a waiting line captured by a network camera.

<System Configuration>

Figure 1A:
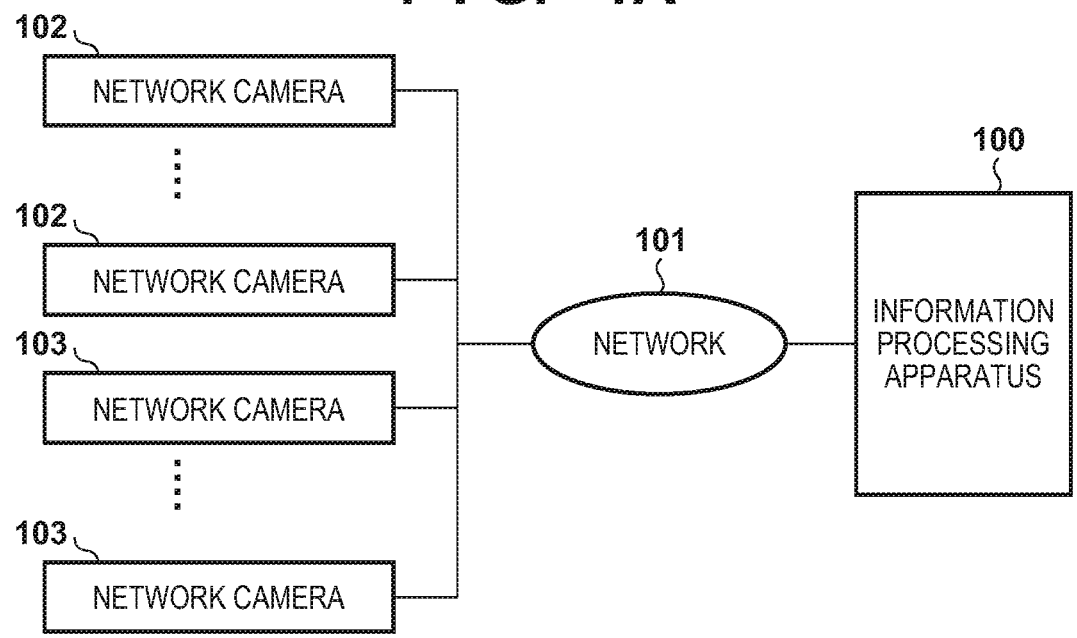
FIGS. 1A and 1B are views that illustrate an overall configuration of a waiting time estimating system.
Figure 1B:
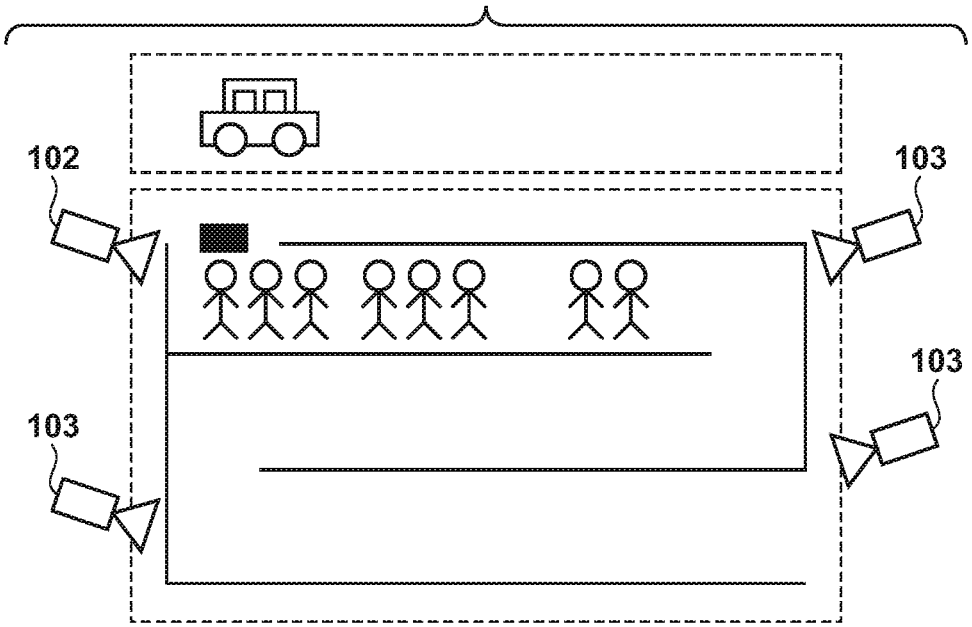

FIGS. 1A and 1B are views that illustrate an overall configuration of a waiting time estimating system. In particular, FIG. 1A is a view illustrating an example of a system configuration, and FIG. 1B is a view for describing an envisioned waiting line state.

The waiting time estimating system includes an information processing apparatus 100, one or more network cameras 102, and one or more network cameras 103. The information processing apparatus 100, the network cameras 102, and the network cameras 103 are connected so as to be able to communicate with each other via a network 101.

FIG. 1B illustrates explanatorily an arrangement of a waiting line and a plurality of network cameras. Here, the waiting line is configured by a plurality of human bodies present in areas that are segmented by thresholds (solid line parts) that were set in advance. One network camera 102 is arranged to capture a waiting line exit (leading position). Also, three network cameras 103 are arranged to capture the waiting line at respectively different angles, and are arranged so that the entire waiting line can be captured by these three cameras.

The waiting time estimating system estimates the waiting time in the waiting line. The waiting time in the waiting line is the time that it takes for an object (human body) that newly lined up at the tail of the waiting line to advance to the leading position of the waiting line, and then leave the waiting line. Here, the waiting time estimating system is assumed to estimate the waiting time in a waiting line configured by several people who are waiting in order at a taxi stand. In other words, the time that will be required from when the person lines up at the tail of the waiting line until when the person gets into a taxi is estimated.

Note that the waiting time estimating system may estimate a waiting time for other kinds of waiting lines. For example, the waiting time estimating system may estimate the waiting time for a waiting line comprising multiple people who are waiting in order at ATMs of a financial institution, an attraction in an amusement park or a theme park, and the like. Also, the waiting time estimating system may estimate the waiting time of a waiting line configured by a plurality of intermediate workpieces waiting to be processed on a factory line. Also, the waiting time estimating system may estimate the waiting time of a waiting line configured by a plurality of pieces of cargo waiting to be sorted by shipping destination on a line in a warehouse in which cargo for shipping is temporarily stored.

The information processing apparatus 100 is an apparatus that obtains from the network cameras 102 and 103 images, such as still images or video, which captured the waiting line and that estimates a waiting time of the waiting line. The information processing apparatus 100 is an information processing apparatus such as, for example, a personal computer (PC), a server apparatus, or a tablet apparatus.

The network camera 102 is a network camera that captures the vicinity of an exit (a leading position) of the waiting line and that transmits images such as still images or video that it captured to the information processing apparatus 100. Meanwhile, the network cameras 103 are network cameras that capture images of the waiting line in different directions to the network cameras 102 and transmit the captured images to the information processing apparatus 100.

In the example of FIG. 1B, one or more network cameras 103 capture the entire waiting line, and transmit captured images to the information processing apparatus 100. The information processing apparatus 100 detects people in images transmitted from the one or more network cameras 103, and makes the detected number of people be the number of objects (number of people) in the waiting line. Also, the one or more network cameras 102 capture the vicinity of the exit of the waiting line, and transmit captured images to the information processing apparatus 100. The information processing apparatus 100 stores a time of detection every time it is detected by using the images transmitted from the network cameras 102 that a person leaves the waiting line. The information processing apparatus 100 detects that a person passes through the exit of the waiting line from a plurality of temporally consecutive frame images, for example.

Figure 2A:
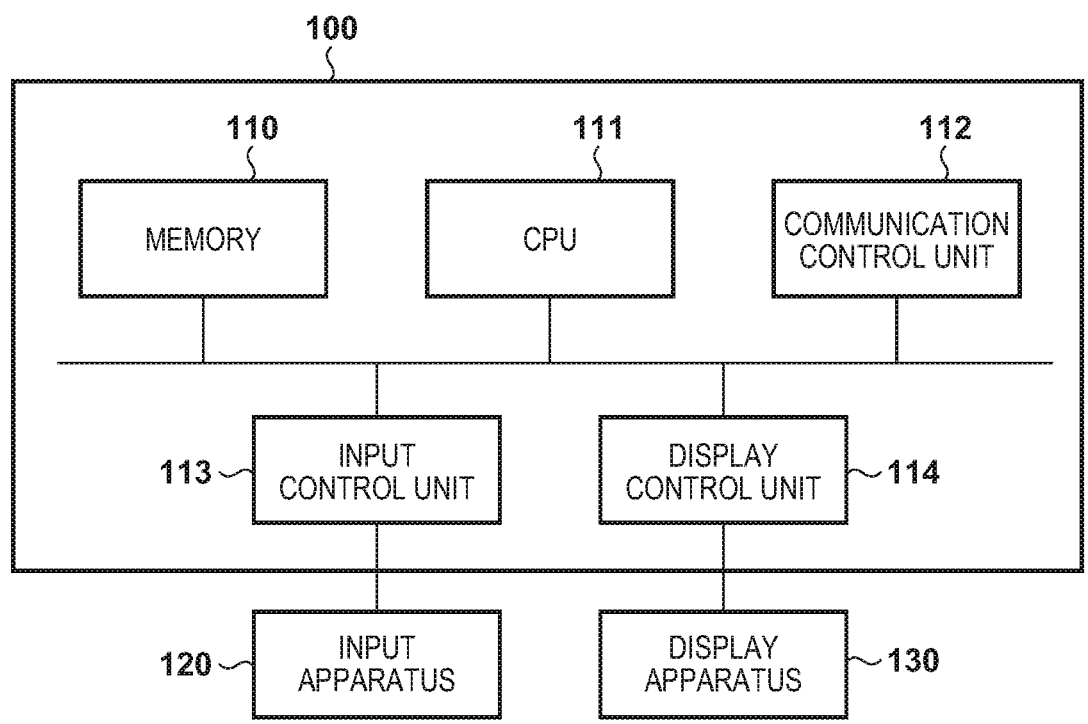
FIGS. 2A and 2B are views that illustrate hardware configurations of an information processing apparatus and a network camera.
Figure 2B:
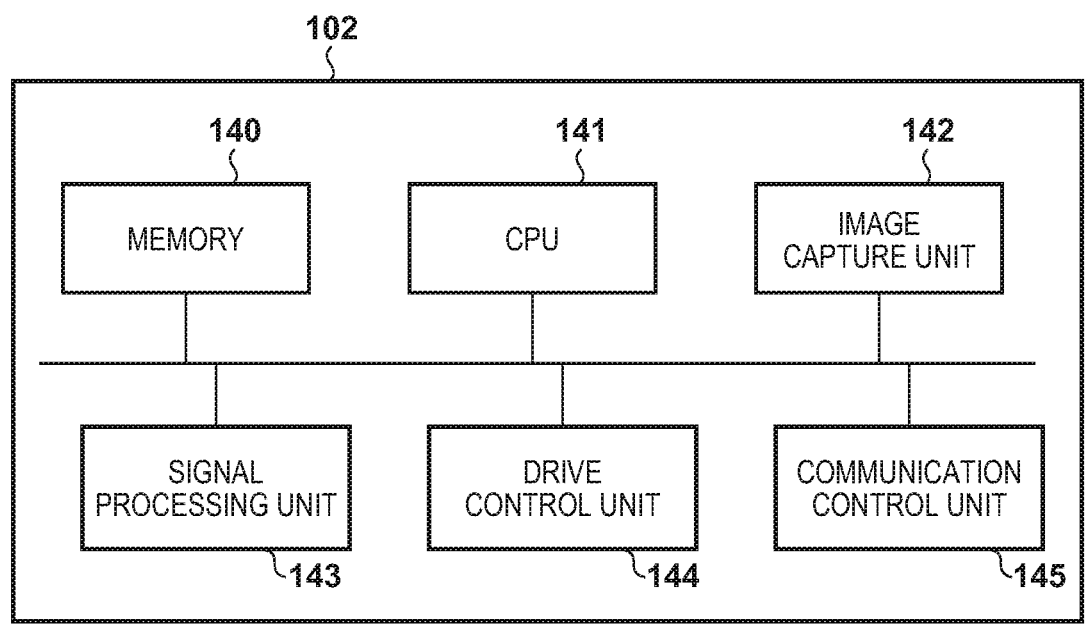

FIGS. 2A and 2B are views that illustrate hardware configurations of the information processing apparatus 100 and the network camera 102. In particular, FIG. 2A illustrates a hardware configuration of the information processing apparatus 100, and FIG. 2B illustrates a hardware configuration of the network camera 102.

The information processing apparatus 100 includes a memory 110, a CPU 111, a communication control unit 112, an input control unit 113, and a display control unit 114.

The memory 110 is a storage apparatus for storing various programs, various setting data, various threshold data, image data in which the waiting line is captured, and the like. The memory 110 is configured by, for example, a hard disk, an optical disk, a memory card, a solid-state drive, or the like. The CPU 111 is a central processing unit for controlling processing of the information processing apparatus 100.

The communication control unit 112 is a communication control unit used for communication with external apparatuses via a network. The input control unit 113 is an input control unit for controlling input of information into the information processing apparatus 100 via an input apparatus 120. The display control unit 114 is a display control unit for controlling display of screens on a display apparatus 130. In FIG. 2A, the information processing apparatus 100, the input apparatus 120, and the display apparatus 130 are illustrated as separate apparatuses, but they may be integrated into a single apparatus. Also, the waiting time estimating system may include a plurality of display apparatuses as the display apparatus 130.

The CPU 111, by executing processing based on a program stored in the memory 110, realizes each functional unit of the information processing apparatus 100 described later in FIG. 3 to FIG. 6, each processing step of the flowcharts described later in FIG. 7 and FIG. 8, and the like.

The network camera 102 includes a memory 140, a CPU 141, an image capture unit 142, a signal processing unit 143, a drive control unit 144, and a communication control unit 145.

The memory 140 is a storage apparatus for storing various programs, various setting data, image data in which the waiting line is captured, and the like. The memory 140 is configured by, for example, a hard disk, an optical disk, a memory card, a solid-state drive, or the like. The CPU 141 is a central processing unit for controlling processing of the network camera 102.

The image capture unit 142 has an image capture element and an optical system for a subject on the image capturing device, and performs capturing on the image capture element with the intersection point between the optical axis of the optical system and the image capturing device as the center of capturing. As the image capture element, a CMOS (Complementary Metal-Oxide Semiconductor) sensor, a CCD (Charged Coupled Device), or the like, may be used.

The signal processing unit 143 performs signal processing in relation to an image signal captured by the image capture unit 142. The signal processing unit 143 performs encoding in relation to an image signal captured by the image capture unit 142, for example. The signal processing unit 143 uses an encoding system such as JPEG (Joint Photographic Experts Group), for example, to perform encoding of an image signal captured by the image capture unit 142. Also, the signal processing unit 143 may use an encoding system such as H.264/MPEG-4 AVC (hereafter, H.264) to perform encoding of an image signal captured by the image capture unit 142. Also, the signal processing unit 143 may use an encoding system such as HEVC (High Efficiency Video Coding) to perform encoding of an image signal captured by the image capture unit 142. Also, the signal processing unit 143 may select the encoding system from among a plurality of encoding systems in accordance with conditions, and then perform encoding.

The drive control unit 144 performs control to change the image capturing direction and the angle of view of the image capture unit 142. Here, it is assumed that it is possible to change the image capturing direction of the image capture unit 142 in a pan direction and in a tilt direction, and that it is possible to change the angle of view of the image capture unit 142. However, a configuration may be such that the network camera 102 does not have a function for changing the image capturing direction in a pan direction and in a tilt direction, and the network camera 102 need not have a function to change the angle of view.

The communication control unit 145 is a communication control unit used for communication with external apparatuses such as the information processing apparatus 100 via the network 101. The communication control unit 145 transmits to the information processing apparatus 100 information of a captured image after it is processed by the signal processing unit 143. Furthermore, the communication control unit 145 receives control commands for the network camera 102 transmitted from the information processing apparatus 100.

The CPU 141 realizes functions of the network camera 102 and various processes in the network camera 102 by executing processing based on a program stored in the memory 140, or the like.

A hardware configuration of the network camera 103 is similar to the hardware configuration of the network camera 102. By a CPU of the network camera 103 executing processing based on a program stored in a memory of the network camera 103, various processes in the network camera 103 are realized.

Figure 3:
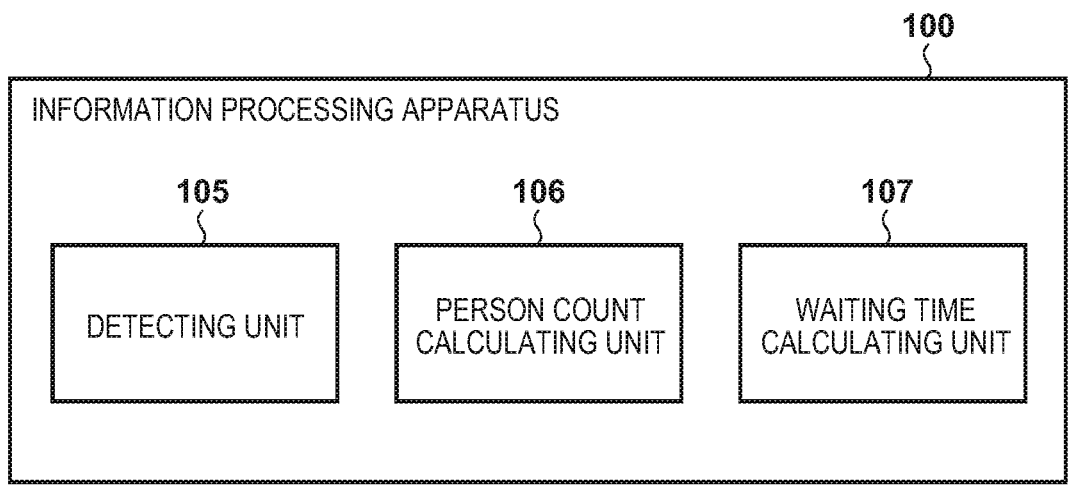
FIG. 3 is a view that illustrates a functional configuration of the information processing apparatus.

FIG. 3 is a view that illustrates a functional configuration of the information processing apparatus 100. The information processing apparatus 100 includes a detecting unit 105, a person count calculating unit 106, and a waiting time calculating unit 107.

The detecting unit 105 analyzes an image of an exit of the waiting line that was transmitted from the network camera 102, and recognizes objects (human bodies) lined up in the waiting line. By this, the detecting unit 105 detects an object that leaves the waiting line. Then, the detecting unit 105 stores in the memory 110, or the like, history information (a detection history) in association with a leave time of an object detected to have left the waiting line. The history information is information indicating when and how many objects left the waiting line. The number of objects that leave the waiting line every predetermined time interval and a time period in which they left the waiting line may be made to be associated in history information, for example.

The person count calculating unit 106 recognizes objects in images of a waiting line transmitted from one or more network cameras 103, and calculates the number of (lined up) objects included in the entire waiting line.

The waiting time calculating unit 107 calculates the waiting time for the waiting line based on the history information stored in the detecting unit 105 and the number of objects included in the entire waiting line obtained by the person count calculating unit 106. In FIG. 3, the detecting unit 105, the person count calculating unit 106, and the waiting time calculating unit 107 are illustrated as being implemented in a single information processing apparatus 100, but they may be implemented distributed across a plurality of information processing apparatuses. In this case, the plurality of information processing apparatuses cooperate to perform similar processing to the information processing apparatus 100.

Figure 4:
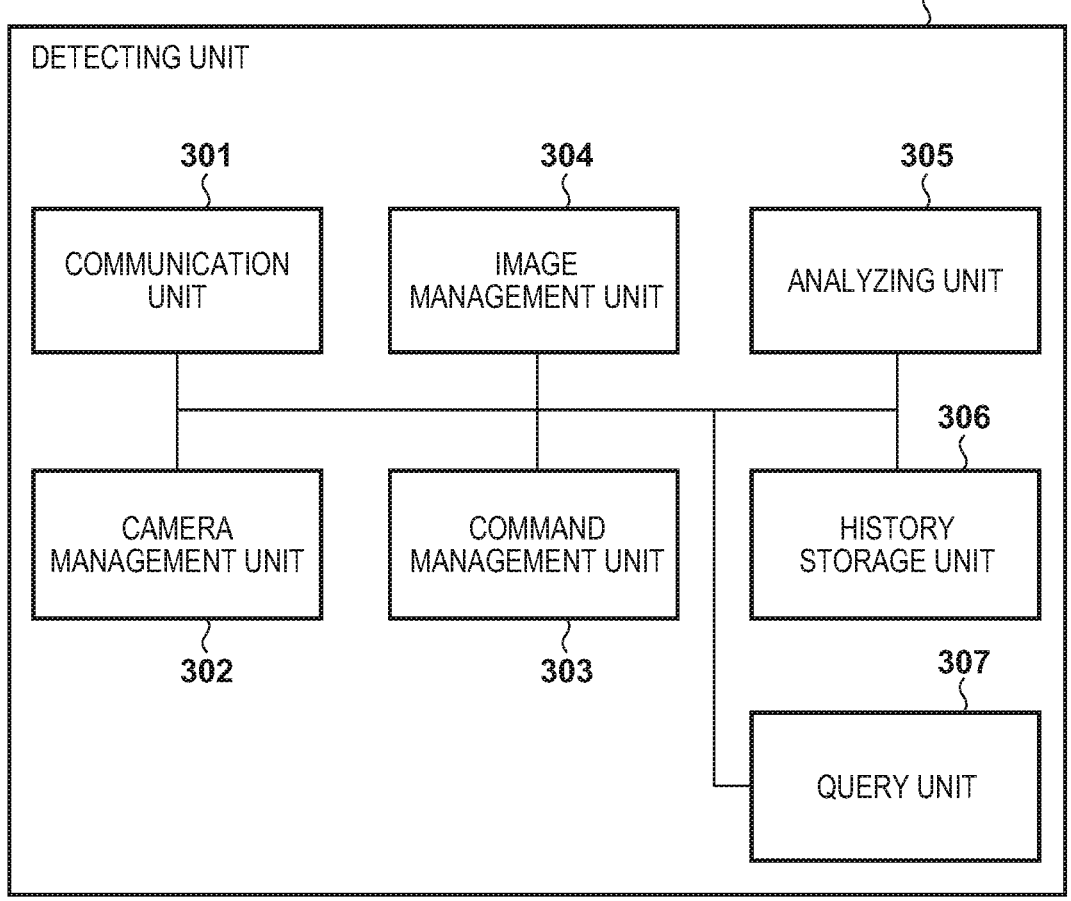
FIG. 4 is a view that illustrates a detailed configuration of a detecting unit.

FIG. 4 is a view that illustrates a detailed configuration of the detecting unit 105. The detecting unit 105 includes a communication unit 301, a camera management unit 302, a command management unit 303, an image management unit 304, an analyzing unit 305, a history storage unit 306, and a query unit 307.

The communication unit 301, via the communication control unit 112, performs communication with other apparatuses such as the network cameras 102 and 103. The camera management unit 302 obtains information of a state of a camera such as a pan head mechanism or a capturing mechanism state, or the like, from the network cameras 102 and 103, and stores and manages the obtained information in the memory 110, or the like. The command management unit 303 manages generation of and transmission of commands for changing a state of a pan head mechanism or a capturing mechanism, and commands for making requests for images to the network cameras 102 and 103.

The image management unit 304 obtains images such as still images or video, or the like, that which are transmitted from the network camera 102 and stores and manages them in the memory 110. The analyzing unit 305 performs detection and tracking of human bodies in relation to images obtained from the network camera 102, and detects objects that leave a waiting line. The memory 110 stores, in advance, information of an image area that a waiting line covers in an image obtained from the network camera 102. The analyzing unit 305 obtains information of the image area that the waiting line covers from the memory 110, for example, and detects objects that leave the image area that the information indicates in images obtained from the network camera 102 as objects that leave the waiting line.

The history storage unit 306, in the case when an object is detected to leave the waiting line by the analyzing unit 305, stores the above-described history information in the memory 110. Here, correspondence information of a number of objects that left the waiting line and a time period in which they left the waiting line is stored in the memory 110. The history storage unit 306 may store in the memory 110, as history information, information of a time of detection whenever an object is detected to leave the waiting line by the analyzing unit 305. The query unit 307, based on reception of a history information query, extracts information according to the query from history information stored by the history storage unit 306, and transmits it to the source of the query.

Figure 5:
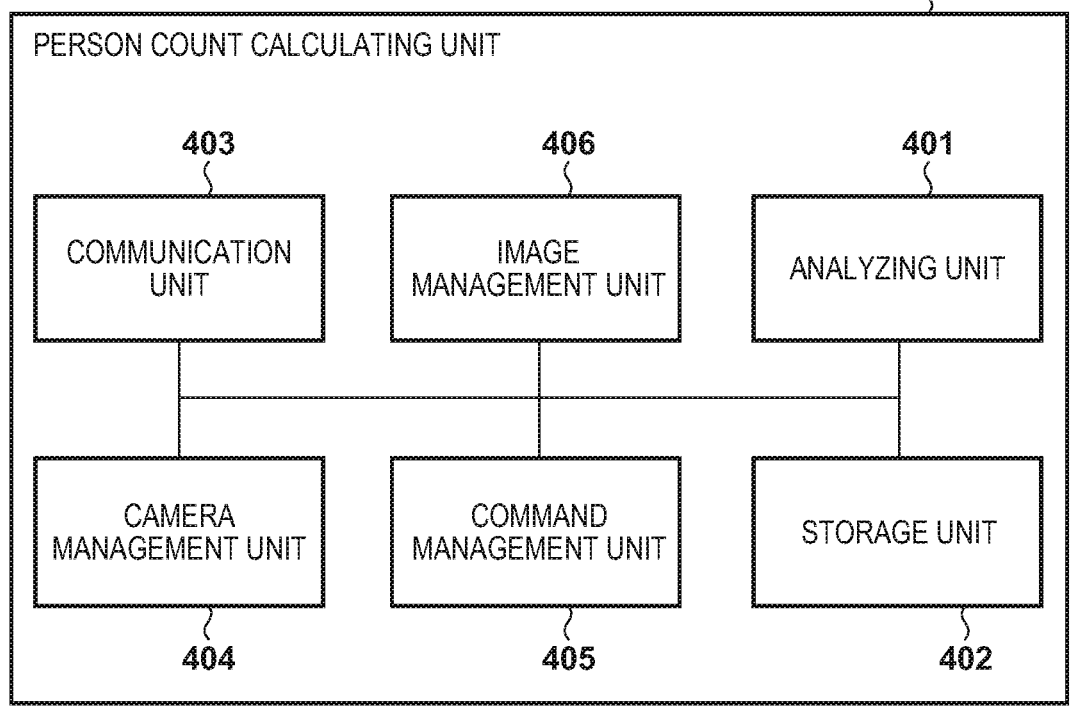
FIG. 5 is a view that illustrates a detailed configuration of a person count calculating unit.

FIG. 5 is a view that illustrates a detailed configuration of the person count calculating unit 106. The person count calculating unit 106 includes an analyzing unit 401, a storage unit 402, a communication unit 403, a camera management unit 404, a command management unit 405, and an image management unit 406. Note that the communication unit 403, the camera management unit 404, the command management unit 405, and the image management unit 406 are respectively similar to the communication unit 301, the camera management unit 302, the command management unit 303, and the image management unit 304.

The analyzing unit 401 detects objects (human bodies) in an image transmitted from a network camera 103, and obtains the number of objects included in the entire waiting line. The analyzing unit 401 may obtain the number of objects included in the entire waiting line from images from a plurality of network cameras 103. Also, the analyzing unit 401 may obtain the number of objects included in the entire waiting line from an image in which the entire waiting line is included captured by a single network camera 103. Also, analysis that includes an image transmitted from the network camera 102 may be performed.

Also, the analyzing unit 401 multiplies, with the number of objects included in the waiting line area in an image captured by the network camera 103, a ratio of the area of the entire waiting line with respect to the area of the waiting line in that image. The number of objects included in the waiting line may be obtained by this processing.

The storage unit 402 stores in the memory 110, or the like, information of the number of objects included in the waiting line calculated by the analyzing unit 401.

Figure 6:
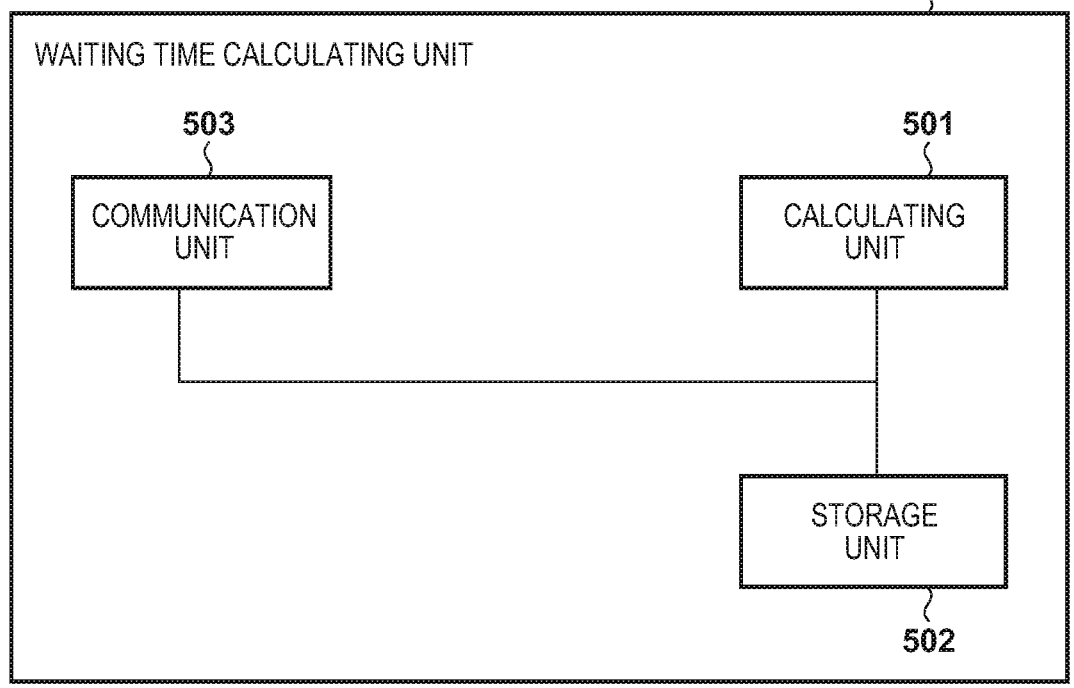
FIG. 6 is a view that illustrates a detailed configuration of a waiting time calculating unit.

FIG. 6 is a view illustrating a detailed configuration of the waiting time calculating unit 107. The waiting time calculating unit 107 includes a calculating unit 501, a storage unit 502, and a communication unit 503.

The communication unit 503 is similar to the communication unit 301. The calculating unit 501 calculates a waiting time based on history information stored in the history storage unit 306 and information of the number of objects stored in the storage unit 402. The storage unit 502 stores in the memory 110, or the like, information of a waiting time calculated by the calculating unit 501.

The calculating unit 501 makes a query for history information for a set period of time, for example, to the query unit 307. The query unit 307 obtains history information for the period of time according to the query from the history information stored by the history storage unit 306, and transmits the obtained history information to the calculating unit 501. The calculating unit 501 calculates the waiting time for the waiting line based on the history information received from the query unit 307 and the number of objects included in the waiting line obtained by the analyzing unit 401.

<Operation of Apparatus>

FIG. 7 is a flowchart that describes an operation of the information processing apparatus 100. Specifically, a flow of processing for estimating the waiting time in a waiting line is illustrated.

In step S601, the calculating unit 501 of the waiting time calculating unit 107 obtains from the person count calculating unit 106 information related to the number of objects. For example, the calculating unit 501 makes a request to the person count calculating unit 106 for the number of objects included in the waiting line. The person count calculating unit 106 transmits to the calculating unit 501 information indicating the number of objects included in the waiting line stored in the storage unit 402. The calculating unit 501 obtains the number of objects that the received information indicates as the number of objects included in the waiting line.

In step S602, the calculating unit 501 of the waiting time calculating unit 107 makes a request to the query unit 307 of the detecting unit 105 for history information for the period of time for a unit time (for example, one minute, three minutes, or the like) set immediately prior to the current time. The query unit 307 obtains history information for the period of time according to the query from the memory 110, or the like, and transmits the obtained information to the calculating unit 501. The calculating unit 501, based on the history information transmitted from the query unit 307, obtains information related to the number of objects that left the line per the set unit time immediately prior to the current time.

In step S603, the calculating unit 501 of the waiting time calculating unit 107 calculates the waiting time. Specifically, the calculating unit 501 divides the "number of objects included in the waiting line" obtained in step S601 by "the number of objects that left the line per the set unit time" obtained in step S602, and calculates the waiting time by multiplying that by the unit time. Then, the calculating unit 501 estimates that the waiting time for the waiting line is the calculated waiting time.

<Calculating the Number of Objects Included in the Waiting Line>

Incidentally, as described above, a calculation of the "number of objects included in the waiting line" that is based on image recognition is included in the estimation of the waiting time. In a case when image recognition is used, it is impossible to make an appropriate estimation in some conditions. For example, depending on the camera placement position, the heights and line up positions of the people waiting, and the like, there are cases when it is not possible to capture an area/range/characteristic sufficient to make the detection by video analysis. This tendency becomes stronger in cases when the waiting line is congested. Here, "congestion" indicates the number of objects per unit area.

Accordingly, in the first embodiment, it is judged whether the waiting line is congested based on the number of objects (the number of people) obtained by image recognition. Thus, in the case when the line is judged to be congested, the number of objects obtained by image recognition is corrected. In particular, correction is performed for each of a plurality of images obtained by the plurality of network cameras 103.

FIG. 8 is a view that illustrates an explanatory waiting line state. The network camera 102 captures the vicinity of the exit of the waiting line. Also, the area in which there could be a waiting line is divided into three partial areas (the capturing ranges 104*a* to 104*c*), and each of the three network cameras 103*a* to 103*c* is configured to capture a respective partial area. In other words, configuration is such that it is possible to cover capture of the entire waiting line by the three network cameras 103*a* to 103*c*.

In the storage unit 402 of the person count calculating unit 106, arrangement of the waiting line capturing ranges and information of the corresponding network camera is stored. In the example of FIG. 8, the capturing ranges 104*a*, 104*b*, and 104*c* are set in order from the front of the line, and the network cameras 103*a*, 103*b*, and 103*c* capture these ranges respectively. The storage unit 402 stores correspondence information for these capturing ranges and the corresponding network cameras.

Figure 9:
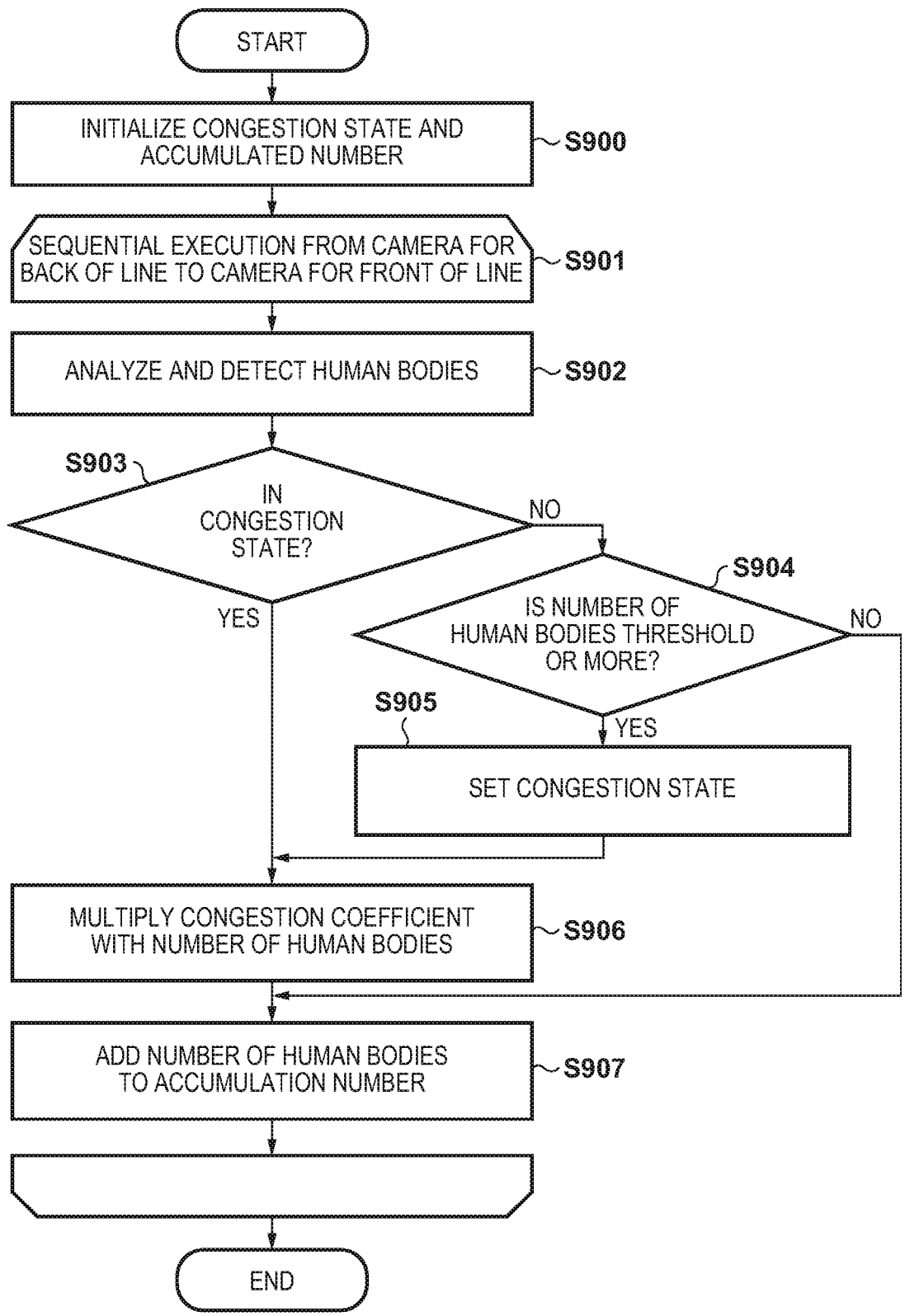
FIG. 9 is a detailed flowchart of person count calculation processing according to a first embodiment.

FIG. 9 is a detailed flowchart of a number of people calculation processing according to the first embodiment. Specifically, FIG. 9 illustrates details of the person count calculation processing that the person count calculating unit 106 executes, triggered by the reception of a query from the waiting time calculating unit 107.

In step S900, the person count calculating unit 106 initializes a congestion state flag stored in the storage unit 402 to "disabled" and an accumulated number of objects to "0". Next, the person count calculating unit 106 executes loop processing (step S901 to step S907) for each network camera capturing the waiting line.

In step S901, the camera management unit 404 of the person count calculating unit 106 determines an order for performing processing from the correspondence information for the network cameras and the capturing ranges stored in the storage unit 402. Specifically, the person count calculating unit 106 executes processing of step S901 to step S907 in order from the network camera capturing the rear of the waiting line to the network camera capturing the front of the waiting line. In other words, here, the order is network camera 103*c*→network camera 103*b*→the network camera 103*a*.

In step S902, the command management unit 405 of the person count calculating unit 106 generates a video obtaining command for the network camera of interest. Then, the image management unit 406 manages the obtained video, and the analyzing unit 401 executes detection processing for detecting human bodies (objects) included in the capturing range of the obtained video. For example, in a first loop, video captured by the network camera 103c is obtained, and human bodies present in the range 104c, which is included in the video, are detected.

In step S903, the person count calculating unit 106 judges the value of the congestion state flag stored in the storage unit 402. In the case when the congestion state flag is "disabled" the processing advances to step S904, and, in the case of "enabled" the processing advances to step S906. Since the congestion state flag is "disabled" in the first loop, the processing advances to step S904.

In step S904, the person count calculating unit 106 judges whether or not the number of objects (specifically, the number of people) detected in step S902 is a predetermined threshold or more. The predetermined threshold is a value that is set in advance and stored in the storage unit 402. For example, a number of people threshold for which an error occurs in the analyzing unit 401 is confirmed in advance for a network camera capture angle, and the predetermine threshold is set. The predetermined threshold may be a different value for each network camera. In the case when the number of detected objects is the threshold or more the processing advances to step S905, and, in the case when it is less than the threshold, the processing advances to step S907.

In step S905, the person count calculating unit 106 sets the congestion state flag stored in the storage unit 402 to "enabled".

In step S906, the analyzing unit 401 of the person count calculating unit 106 calculates a corrected number of people (corrected number) obtained by multiplying a predetermined correction coefficient by the number of people detected in step S902, and stores the corrected number of people in the storage unit 402. A predetermined correction coefficient is a value that is set in advance and stored in the storage unit 402. For example, the number of objects detected in the analyzing unit 401 and the actual number of objects are confirmed in advance for a network camera capture angle, and a ratio of these is set as the predetermined correction coefficient. The correction coefficient may be a value that fluctuates in accordance with the number of people detected, and may be a value that is different for each network camera that is the distribution source of the video that is analyzed.

In step S907, the number of objects after the correction in step S906 or the number of people detected in step S902 is added to the accumulated number of objects.

After the foregoing loop processing (step S901 to step S907) is executed for all of the network cameras (in other words, after the processing for the network camera 103a completes), the flow ends. By this, a number of objects in the waiting line corrected in accordance with the congested condition will be saved in the accumulated number of objects. In particular, it is automatically judged that congestion is continuing at the exit (leading position of the line) side of the line from the position judged to be congested using the congestion state flag, and it is possible to perform correction efficiently by omitting congestion judgement for images processed thereafter.

As described above, by virtue of the first embodiment, the number of objects in the waiting line is calculated by performing a correction in accordance with the degree of congestion of the waiting line. By using the thus corrected number of objects, it becomes possible to estimate, with higher accuracy, the waiting time for a waiting line. In particular, by using an image from a network camera that captures a waiting line, the waiting time is estimated adaptively even in a case when there is a change in the waiting line (number of people, length, or the like).

Note that, in the foregoing description, the information processing apparatus 100 is described as performing the detection of the number of objects included in the captured images from the respective network cameras, but configuration may be such that this is performed by each network camera. For example, configuration may be taken to calculate the number of objects in the captured images in the network cameras 103 and notify the number to the information processing apparatus 100. In such a case, the information processing apparatus 100 performs correction of the respective numbers based on the number of objects notified from each network camera, and calculates the number of objects included in the entire waiting line.

Also, in the foregoing description, configuration is such that an object that exits the waiting line is detected based on images captured by the network cameras 102. However, other known apparatuses (such as various sensors) may be used if they are able to detect the objects that leave the waiting line.

Second Embodiment

In the second embodiment, a description is given for another configuration for obtaining the number of objects included in a waiting line. Specifically, the point that it is judged whether or not the waiting line is congested from history information that is correspondence information between the number of objects that left the waiting line and the time period and from a traveling distance of an object per unit time that is calculated by captured image analysis differs from the first embodiment. The system configuration (FIGS. 1A and 1B), the configurations of the respective apparatuses (FIG. 2A to FIG. 6), and the overall operation (FIG. 7) are similar to that in the first embodiment and so a description thereof is omitted.

<Calculating the Number of Objects Included in the Waiting Line>

Figure 10:
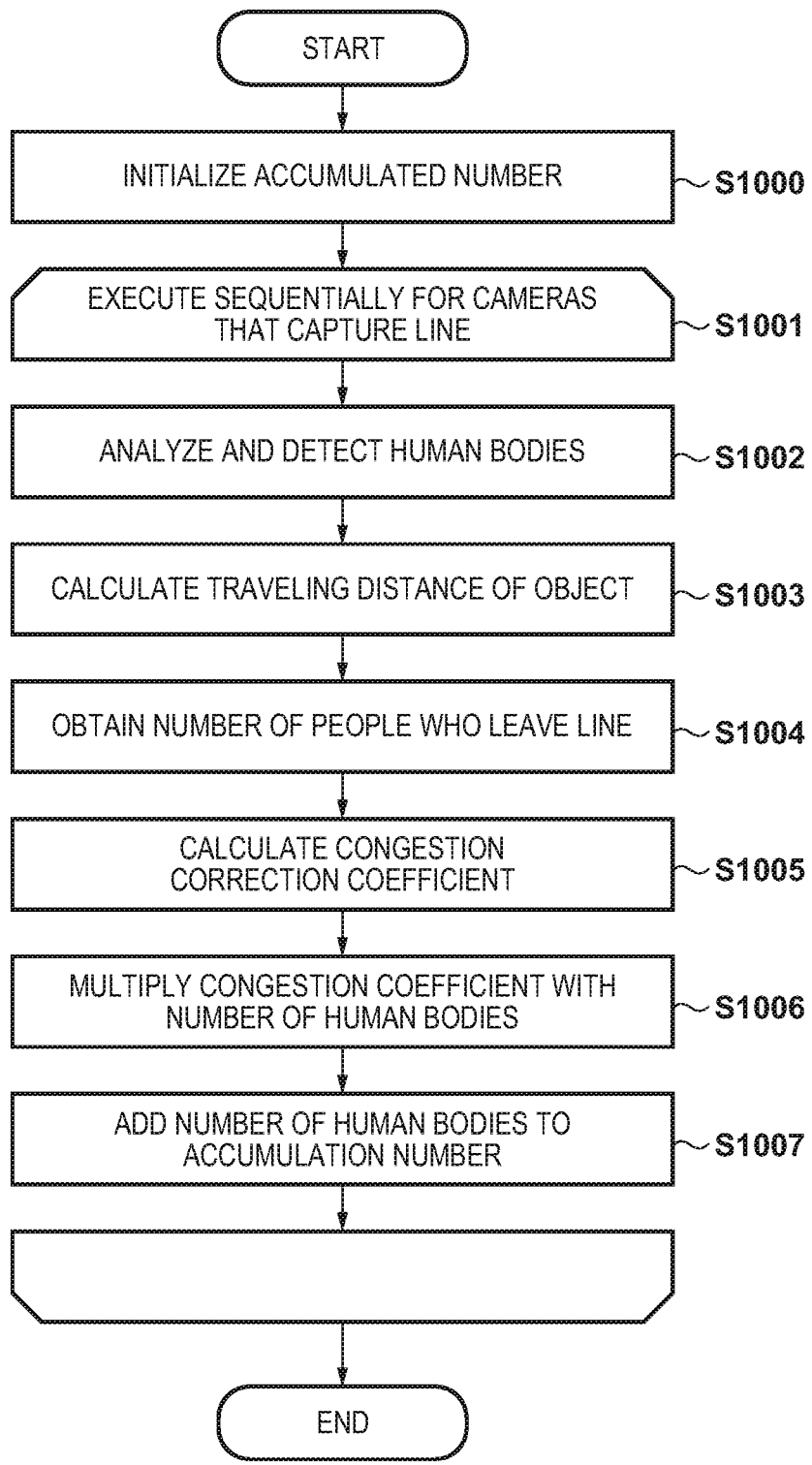
FIG. 10 is a detailed flowchart of person count calculation processing according to a second embodiment.

FIG. 10 is a detailed flowchart of number of people calculation processing according to the second embodiment.

In step S1000, the person count calculating unit 106 initializes to "0" the accumulated number of objects stored in the storage unit 402. Next, the person count calculating unit 106 executes loop processing (step S1001 to step S1007) for each network camera capturing the waiting line.

In step S1001, the camera management unit 404 of the person count calculating unit 106 sequentially selects the network cameras capturing the waiting line and executes subsequent processing (step S1002 to step S1007).

In step S1002, the person count calculating unit 106 detects objects in relation to an image obtained by the network camera selected in step S1001. Specifically, the person count calculating unit 106 causes the command management unit 405 to generate a video obtaining command, the image management unit 406 to manage the obtained video, and the analyzing unit 401 to detect objects included in a capturing range.

In step S1003, the person count calculating unit 106 obtains, from the image management unit 406, past video of the network camera selected in step S1001. Then, analysis is performed in the analyzing unit 401 according to the video obtained in step S1002, the objects in each video frame are recognized, and movement of objects is tracked between a few frames. Then, based on the movement trajectory of an object and the size of the object, a traveling distance and a time period is calculated.

A configuration may be such that, for the time period, a portion for which the result of recognition of an object is good is cropped. In the case when a time period is clipped, the traveling distance over the clipped period of time is calculated. The traveling distance is calculated based on the shape of the objects and the number of objects lined up in an ideal envisioned waiting line by the analyzing unit 401. In the calculation of the traveling distance of an object, an average of traveling distances of a plurality of objects that are detected may be used, and a traveling distance of one object (for example, a particular person) for which analysis was most ideal in the video may be used as a representative.

In step S1004, the person count calculating unit 106 obtains the number of objects that exited the waiting line in the time period by making a request to the query unit 307 to obtain the history information corresponding to the time period calculated in step S1003.

In step S1005, the person count calculating unit 106 judges whether or not the waiting line is congested based on the traveling distance of the object calculated in step S1003 and the number of objects that exited the line obtained in step S1004. Also, a predetermined coefficient, which will be described later, is calculated.

In the case when the traveling distance of an object is small compared to the number of objects that left the line, it is envisioned that the frequency of cases in which objects are overlapped when captured and cannot be detected will increase. Therefore, a predetermined coefficient for correcting the number of objects is calculated as a coefficient for increasing the number of objects. The coefficient increases the number of objects more the more congested the waiting line is, since it is envisioned that there will be more overlapping, and that the ratio of undetected objects/detected objects will be greater. The method of calculating the coefficient may differ for each network camera.

In step S1006, the person count calculating unit 106 calculates the number of objects corrected by multiplying the coefficient calculated in step S1005 with the number of objects detected in step S1002. In step S1007, the person count calculating unit 106 adds the corrected number of objects obtained in step S1006 to the accumulated number of objects.

After the above-described loop processing (step S1001 to step S1007) is executed for all network cameras, the flow ends. By this, a number of objects in the waiting line corrected in accordance with the congested condition will be saved in the accumulated number of objects.

As described above, by virtue of the second embodiment, the number of objects in the waiting line are calculated by performing a correction in accordance with the degree of congestion of the waiting line. By using the thus corrected number of objects, it becomes possible to estimate with higher accuracy the waiting time for a waiting line.

(Variation)

As described above, the predetermined coefficient is calculated in step S906 of the first embodiment and step S1005 of the second embodiment as a coefficient for increasing the number of objects more, the more congested is the waiting line. As a specific calculation method, it is possible to use the following calculation method.

The analyzing unit 401 obtains, from the image management unit 406, past to latest video of the network camera targeted for analysis, and detects motion vectors between a plurality of frame images. Then, an area in which motion vectors are detected in the image is compared with an area that detected objects cover. In a case when the area that the objects cover is smaller, it is judged that there is congestion, a coefficient for increasing the number of objects is set. At this time, the coefficient can be calculated based on a ratio between the area in which motion vectors are detected and the area that the objects cover. Alternatively, the coefficient can be calculated based on a ratio of the area of overlap between the area that objects cover and the area in which motion vectors are detected, and the area where these do not overlap.

Alternatively, the analyzing unit 401 obtains from the image management unit 406 a background image that does not include an object from past video of the network camera targeted for analysis, and compares a difference area, where there is a difference with a most recent video, and an area that detected objects cover. Also, in a case when the area that the objects cover is smaller, it is judged that there is congestion, and a coefficient for increasing the number of objects is set. At this time, the coefficient can be calculated based on a ratio between the area of difference from the background image and the area that the objects cover. Alternatively, the coefficient can be calculated based on a ratio of the area of overlap between the area of difference from the background image and the area that objects cover and the area where these do not overlap.

Alternatively, the analyzing unit 401 obtains the most recent image from the image management unit 406, and obtains high-frequency component values for image frequencies of the image. Also, the area that detected objects cover is obtained. Then, it is possible to calculate the coefficient based on a ratio between the high-frequency component values and the area that the objects cover.

Other Embodiments

Embodiment(s) of the present invention can also be realized by a computer of a system or an apparatus that reads out and executes computer executable instructions (e.g., one or more programs) recorded on a storage medium (which may also be referred to more fully as anon-transitory computer-readable storage medium) to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus operable to estimate a waiting time in a waiting line configured by a plurality of objects, the information processing apparatus comprising:
   at least one processor operatively coupled to a memory, serving as:
   (a) a first obtaining unit configured to obtain a number of objects detected in an image in which the waiting line is captured;
   (b) a second obtaining unit configured to obtain a number of objects that leave the waiting line per unit time;
   (c) a correcting unit configured to correct the number obtained by the first obtaining unit by multiplying a correction coefficient with the number obtained by the first obtaining unit, in a case when the number obtained by the first obtaining unit is equal to or greater than a predetermined threshold or more; and
   (d) an estimation unit configured to estimate the waiting time in the waiting line based on the corrected number and the number obtained by the second obtaining unit, in the case when the number obtained by the first obtaining unit is equal to or greater than the predetermined threshold.

2. The information processing apparatus according to claim 1, wherein the estimation unit estimates the waiting time in the waiting line based on the number obtained by the first obtaining unit and the number obtained by the second obtaining unit, in a case when the number obtained by the first obtaining unit is not equal to or greater than the predetermined threshold or more.

3. The information processing apparatus according to claim 1, wherein the at least one processor operatively coupled to the memory, further serves as (e) an image obtaining unit configured to obtain a plurality of images obtained by
   a plurality of cameras configured to respectively capture a plurality of partial areas that configure an area in which the waiting line can be present,
   wherein the first obtaining unit performs object detection processing on each of the plurality of images and obtains an accumulated number of objects detected by the detection processing.

4. The information processing apparatus according to claim 3, wherein (i) the first obtaining unit is configured to perform the detection processing in an order from an image of a partial area positioned more rearward in the waiting line among the plurality of images and to determine whether or not a number of detected objects is equal to or greater than the threshold, and (ii) the correcting unit, in a case when it is determined that the number of detected objects in a particular image included in the plurality of images is equal to or greater than the threshold, corrects the accumulated number by multiplying a correction coefficient with the number of detected objects in the particular image and images to be processed thereafter, and (iii) the estimation unit is configured to estimate the waiting time in the waiting line based on the corrected accumulated number and the number obtained by the second obtaining unit.

5. An information processing apparatus operable to estimate a waiting time in a waiting line configured by a plurality of objects, the information processing apparatus comprising:
   at least one processor operatively coupled to a memory, serving as:
   (a) a first obtaining unit configured to obtain a number of objects detected in an image in which the waiting line is captured;
   (b) second obtaining unit configured to obtain a number of objects that leave the waiting line per unit time;
   (c) a third obtaining unit configured to obtain a traveling distance of an object per the unit time in the waiting line from a plurality of images that captured the waiting line at different times;
   (d) a correcting unit configured to correct the number obtained by the first obtaining unit by multiplying a correction coefficient that is based on the number obtained by the second obtaining unit and the traveling distance obtained by the third obtaining unit with the number obtained by the first obtaining unit; and
   (e) an estimation unit configured to estimate the waiting time in the waiting line based on the corrected number and the number obtained by the second obtaining unit.

6. The information processing apparatus according to claim 5, wherein the at least one processor operatively coupled to the memory, further serves as (f) an image obtaining unit configured to obtain a plurality of images obtained by a plurality of cameras configured to respectively capture a plurality of partial areas that configure an area in which the waiting line can be present,
   wherein the first obtaining unit performs object detection processing on each of the plurality of images and obtains an accumulated number of objects detected by the detection processing.

7. The information processing apparatus according to claim 1, wherein the second obtaining unit obtains the number of objects that leave the waiting line per unit time based on a detection history of an object obtained by a detector placed at a leading position of the waiting line.

8. The information processing apparatus according to claim 1, wherein the correcting unit changes the correction coefficient in accordance with the number of detected objects.

9. The information processing apparatus according to claim 1, wherein the at least one processor operatively coupled to the memory, further serves as (e) a motion detection unit configured to detect motion vectors between a plurality of images that captured the waiting line at different times,
   wherein the correction coefficient is calculated based on a ratio between an image area in which motion vectors are detected and an image area that the objects cover.

10. The information processing apparatus according to claim 1, wherein the at least one processor operatively coupled to the memory, further serves as (e) a storage device configured to store a background image of an area in which the waiting line can be present,
    wherein the correction coefficient is calculated based on a ratio between an image area in which there is a difference between an image that captured the waiting line and the background image and an image area that the objects cover in the image that captured the waiting line.

11. A method of controlling an information processing apparatus operable to estimate a waiting time in a waiting line configured by a plurality of objects, the method comprising:
(A) at least one processor; and
(B) at least one memory storing instructions that, when executed by the at least one processor, cause the at least one processor to perform the steps of:
(a) a first obtaining step for obtaining a number of objects detected in an image in which the waiting line is captured;
(b) a second obtaining step for obtaining a number of objects that leave the waiting line per unit time;
(c) a correcting step for correcting the number obtained by the first obtaining step by multiplying a correction coefficient with the number obtained by the first obtaining step, in a case when the number obtained by the first obtaining step is equal to or greater than a predetermined threshold; and
(d) an estimation step for estimating the waiting time in the waiting line based on the corrected number and the number obtained by the second obtaining step, in the case when the number obtained by the first obtaining step is equal to or greater than the predetermined threshold.

12. A method of controlling an information processing apparatus operable to estimate a waiting time in a waiting line configured by a plurality of objects, the method comprising:
(A) at least one processor; and
(B) at least one memory storing instructions that, when executed by the at least one processor, cause the at least one processor to perform the steps of:
(a) a first obtaining step for obtaining a number of objects detected in an image in which the waiting line is captured;
(b) a second obtaining step for obtaining a number of objects that leave the waiting line per unit time;
(c) a third obtaining step for obtaining a traveling distance of an object per unit time in the waiting line from a plurality of images that captured the waiting line at different times;
(d) a correcting step for correcting the number obtained by the first obtaining step by multiplying a correction coefficient that is based on the number obtained by the second obtaining step and the traveling distance by the third obtaining step with the number obtained by the first obtaining step; and
(e) an estimation step for estimating the waiting time in the waiting line based on the corrected number and the number obtained by the second obtaining step.

13. A non-transitory computer-readable recording medium storing a program that causes a computer to function as an information processing apparatus operable to estimate a waiting time in a waiting line configured by a plurality of objects, the information processing apparatus comprising:
at least one processor operatively coupled to a memory, serving as:
(a) a first obtaining unit configured to obtain a number of objects detected in an image in which the waiting line is captured;
(b) a second obtaining unit configured to obtain a number of objects that leave the waiting line per unit time;
(c) a correcting unit configured to correct the number obtained by the first obtaining unit by multiplying a correction coefficient with the number obtained by the first obtaining unit, in a case when the number obtained by the first obtaining unit is equal to or greater than a predetermined threshold; and
(d) an estimation unit configured to estimate the waiting time in the waiting line based on the corrected number and the number obtained by the second obtaining unit, in the case when the number obtained by the first obtaining unit is equal to or greater than the predetermined threshold.

14. A non-transitory computer-readable recording medium storing a program that causes a computer to function as an information processing apparatus operable to estimate a waiting time in a waiting line configured by a plurality of objects, the information processing apparatus comprising:
at least one processor operatively coupled to a memory, serving as:
(a) a first obtaining unit configured to obtain a number of objects detected in an image in which the waiting line is captured;
(b) second obtaining unit configured to obtain a number of objects that leave the waiting line per unit time;
(c) a third obtaining unit configured to obtain a traveling distance of an object per the unit time in the waiting line from a plurality of images that captured the waiting line at different times;
(d) a correcting unit configured to correct the number obtained by the first obtaining unit by multiplying a correction coefficient that is based on the number obtained by the second obtaining unit and the traveling distance obtained by the third obtaining unit with the number obtained by the first obtaining unit; and
(e) an estimation unit configured to estimate the waiting time in the waiting line based on the corrected number and the number obtained by the second obtaining unit.

* * * * *